Patented Nov. 27, 1923.

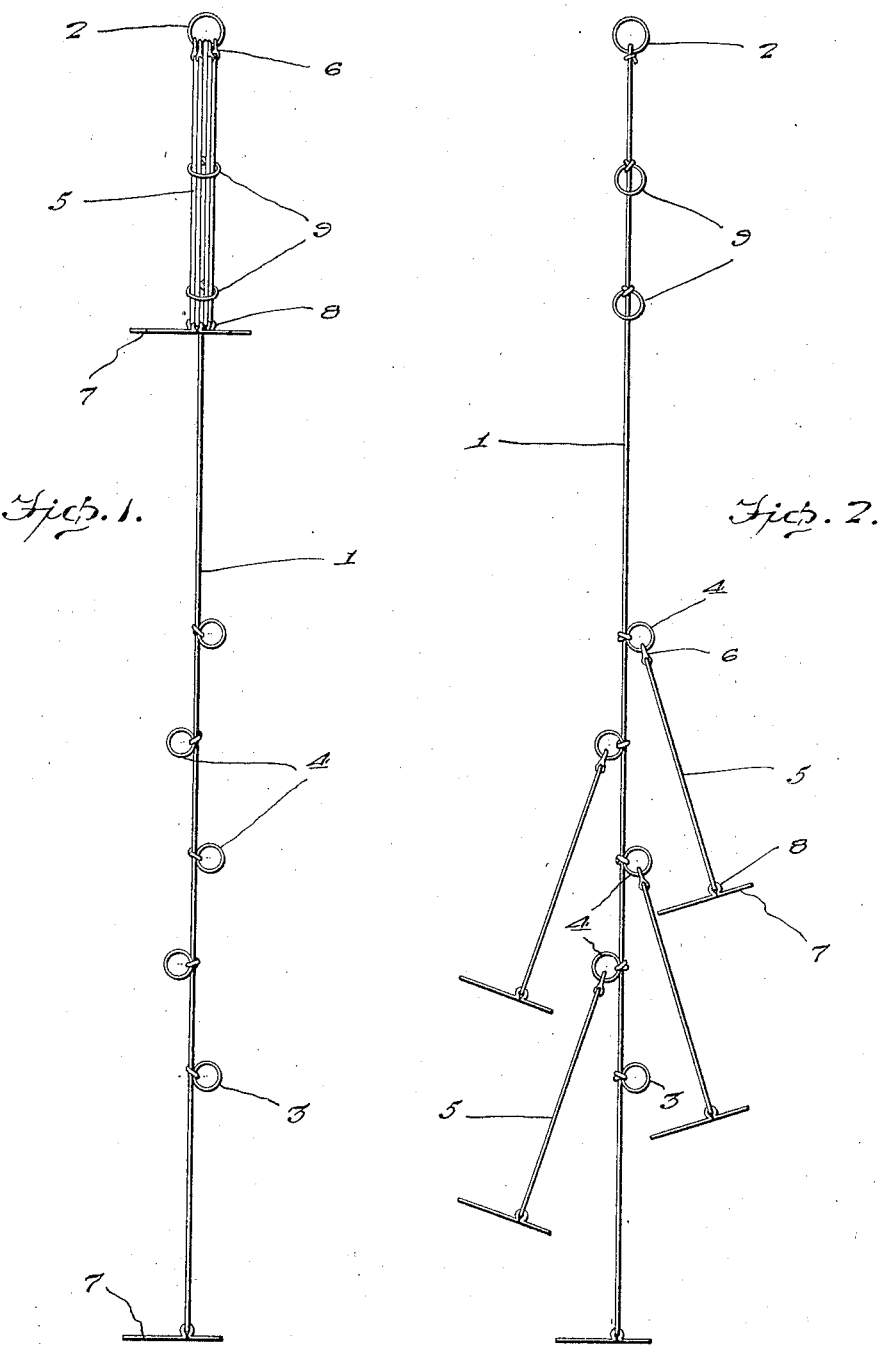

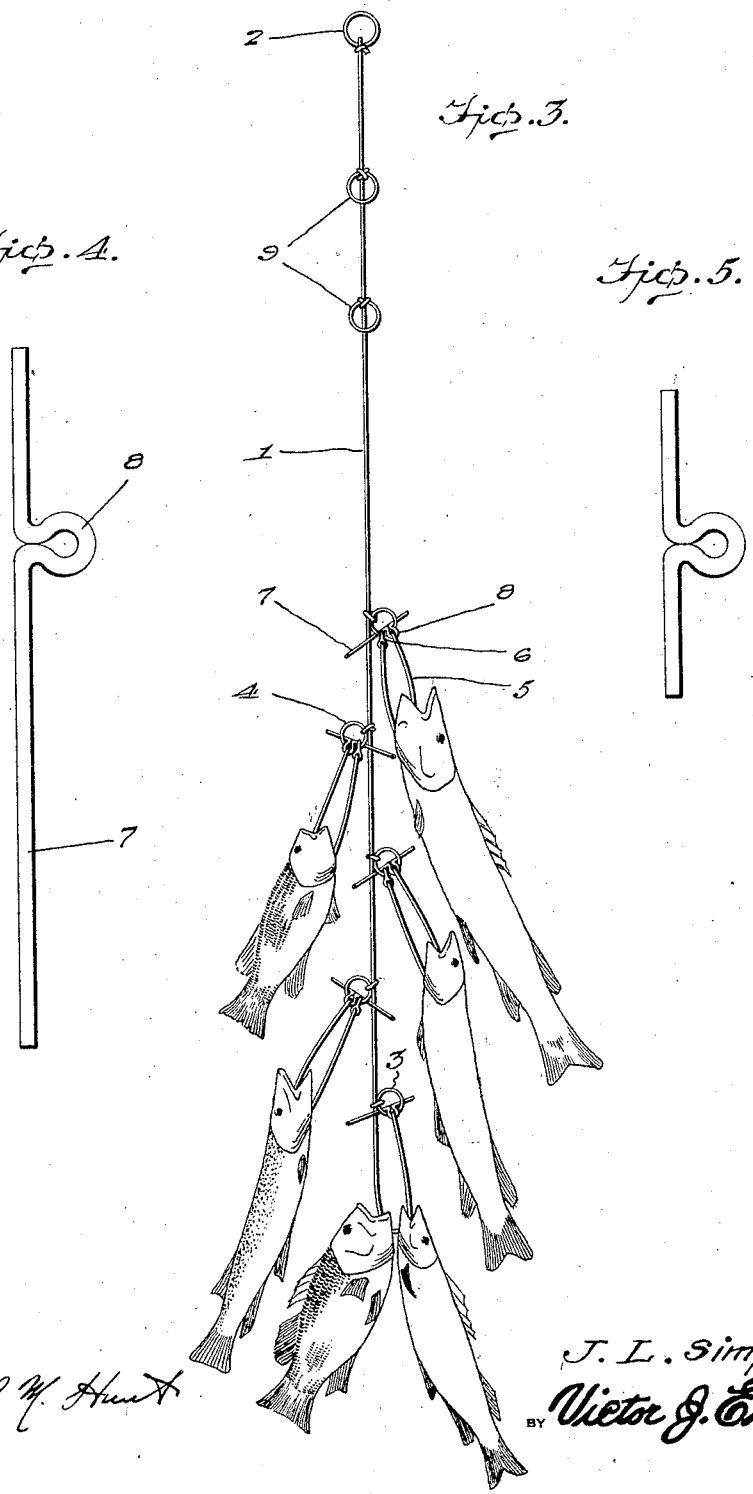

1,475,891

UNITED STATES PATENT OFFICE.

JAMES L. SIMPSON, OF WATERLOO, IOWA.

FISH STRING.

Application filed June 12, 1922. Serial No. 567,635.

*To all whom it may concern:*

Be it known that I, JAMES L. SIMPSON, a citizen of the United States, residing at Waterloo, in the county of Black Hawk and State of Iowa, have invented new and useful Improvements in Fish Strings, of which the following is a specification.

This invention relates to means for holding fish after the same have been caught and removed from the hooks or net, the general object of the invention being to provide means for securing each fish to a line or string by a short loop so that the fish will be spaced apart. This will prevent the fish from being killed by too close contact and the fish will remain alive for some time.

Another object of the invention is to provide means for facilitating the placing of the fish on the loops and for connecting the loops to the line.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view showing the holder when not in use.

Figure 2 is a view with the holder ready to receive the fish.

Figure 3 is a view showing the holder full of fish.

Figures 4 and 5 are detail views.

In these views, 1 indicates a string or line which has a ring 2 at its top, a ring 3 at its bottom and four rings 4 on its lower part which are spaced from each other and from the bottom ring. I provide a short piece of string, shown at 5, for forming a loop to engage each of the five lower rings. A snap fastener 6 is secured to one end of each string 5 and a bar 7 is fastened to the other end of each string. This bar is provided with a loop forming an eye 8 to receive the string. The loop is preferably formed nearer one end than the other. Instead of placing snap fasteners on the short strings short bars similar to the bars 7 may be used for holding the ends of the strings in the rings.

When the device is not in use the short strings may be placed in the top ring 2, as shown in Figure 1. The fifth string may be left in engagement with the bottom ring 3. When a fish is caught one of the strings is removed from the top ring and the bar is passed through the mouth and gills of the fish, the long part of the bar facilitating this operation, and then the fastener and the bar are placed in engagement with one of the rings so that a loop is formed by the short string to hold the fish spaced from the main string. This device will keep the fish alive for a long time as it prevents crowding and crushing of the fish. Several loops may be placed in engagement with a ring and several fish may be placed on each loop. This device will also serve to anchor the caught fish in a stream or lake.

Other rings 8 may be provided through which the short strings are threaded when the device is not being used, as shown in Figure 1.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A fish holder of the class described comprising a main flexible member, rings secured to said member and a number of short flexible members, means at each end of each short member for engaging a ring to form the member in a loop to support a fish, the means at one end of each short member acting to thread the member through the mouth and gills of the fish.

2. A fish holder of the class described comprising a main string, rings at the ends and lower part of said string, a plurality of short strings, means at one end of each short string for engaging a ring and a bar connected with the other end of each short string for engaging a ring and for facilitating the passing of the short string through the mouth and gills of a fish.

In testimony whereof I affix my signature.

JAMES L. SIMPSON.